United States Patent [19]

Vadas

[11] 4,006,677
[45] Feb. 8, 1977

[54] PEACH REPITTING MACHINE
[75] Inventor: Leslie Vadas, Los Gatos, Calif.
[73] Assignee: FMC Corporation, San Jose, Calif.
[22] Filed: June 23, 1975
[21] Appl. No.: 589,501
[52] U.S. Cl. .................................. 99/549; 99/562; 99/564
[51] Int. Cl.² .................... A23N 4/12; A27J 25/00; A23N 4/24
[58] Field of Search ............ 99/547, 549, 562, 563, 99/564; 198/218, 219; 214/1 BB

[56] References Cited
UNITED STATES PATENTS

| | | | |
|---|---|---|---|
| 2,257,341 | 9/1941 | Jepson | 99/549 X |
| 2,376,526 | 5/1945 | Thompson | 99/563 X |
| 2,398,780 | 4/1946 | Edwald et al. | 99/563 X |
| 3,225,904 | 12/1965 | Vadas | 99/563 X |

Primary Examiner—Harvey C. Hornsby
Assistant Examiner—Robert Pous
Attorney, Agent, or Firm—C. E. Tripp; R. B. Catto

[57] ABSTRACT

A machine for repitting peach halves which have previously been subjected to a pitting operation, but wherein the peach halves are not completely pitted because of split or fragmented pits remaining attached to the fruit. The machine automatically feeds the peach halves, centers them relative to a pitting knife, and re-pits the halves to remove any pit fragments which have escaped the initial pitting operation. Since the initial pitting is done by first cutting whole peaches in half along their entire planes and the resulting peach halves cannot be repitted in the same machine, the present peach repitting machine provides a recovery system for the primary pitting operation in order to increase the overall yield without hand-pitting.

15 Claims, 30 Drawing Figures

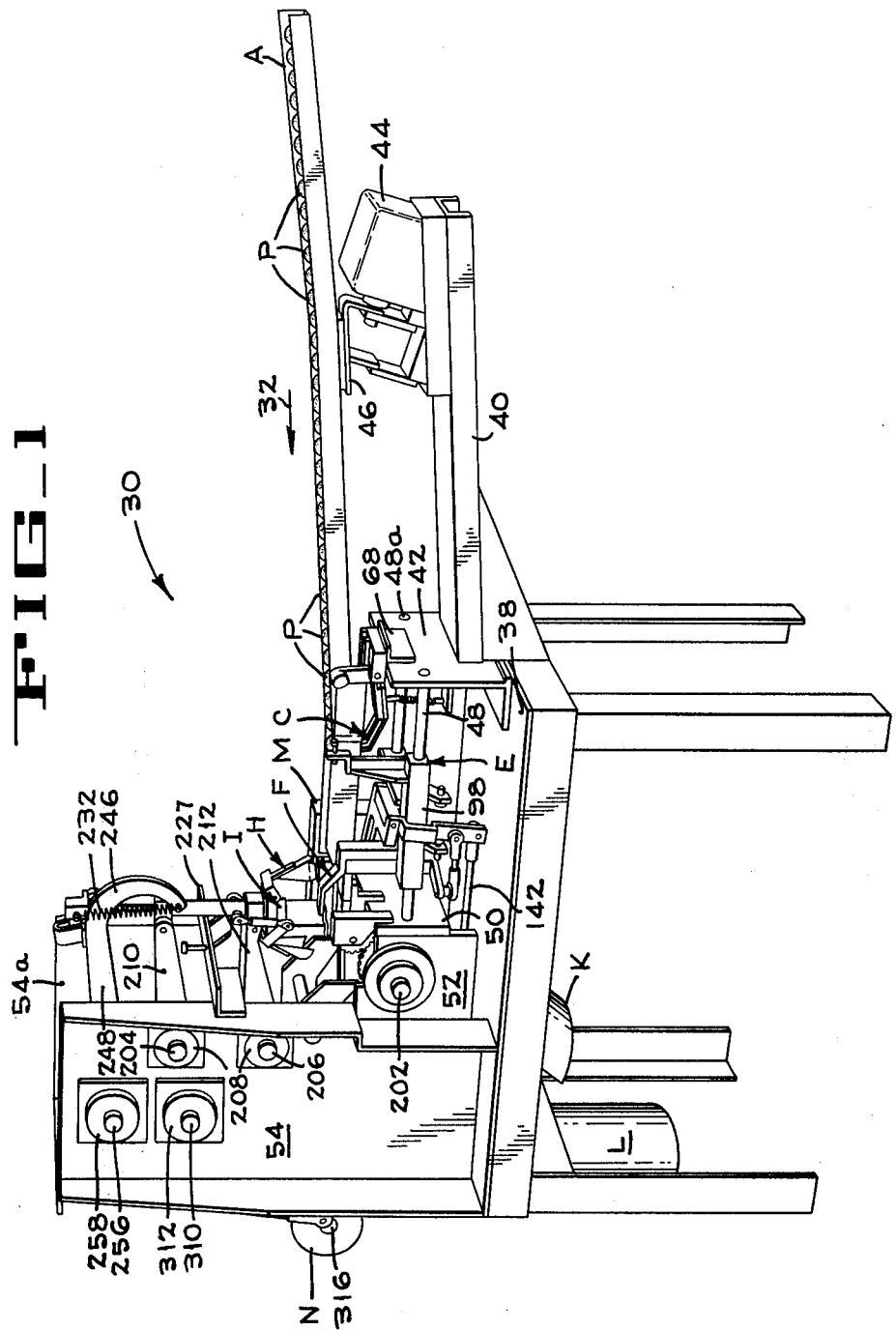

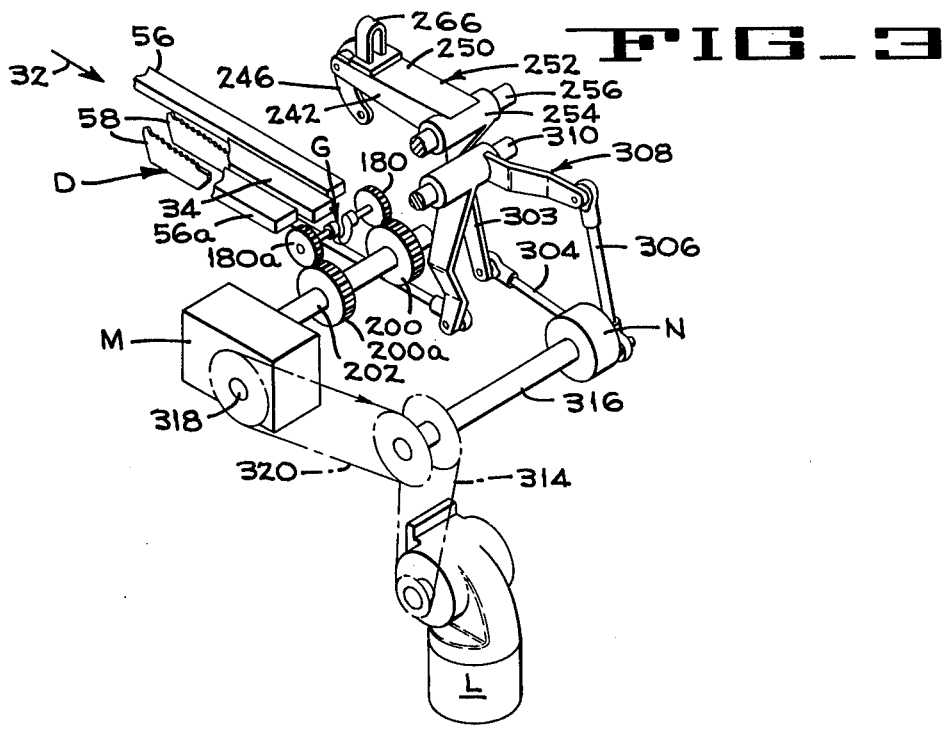
FIG_3
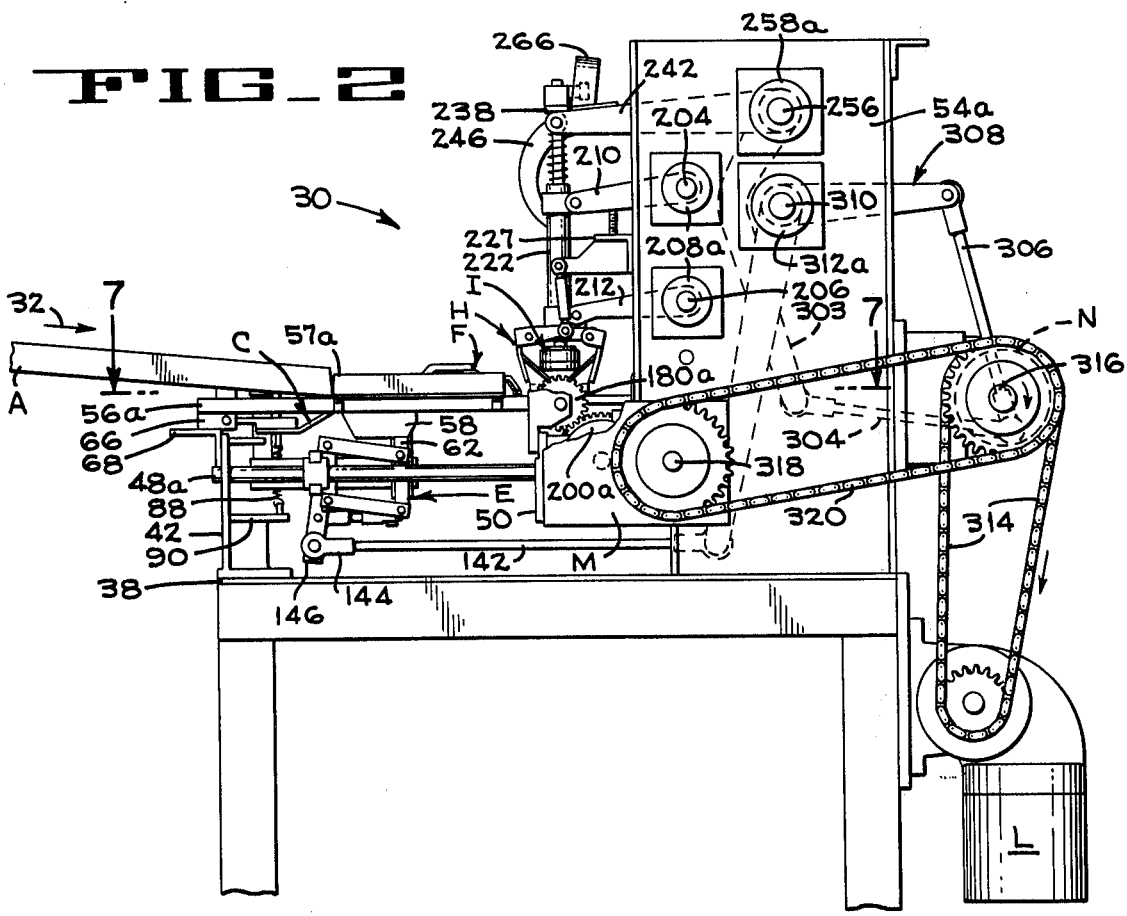
FIG_2

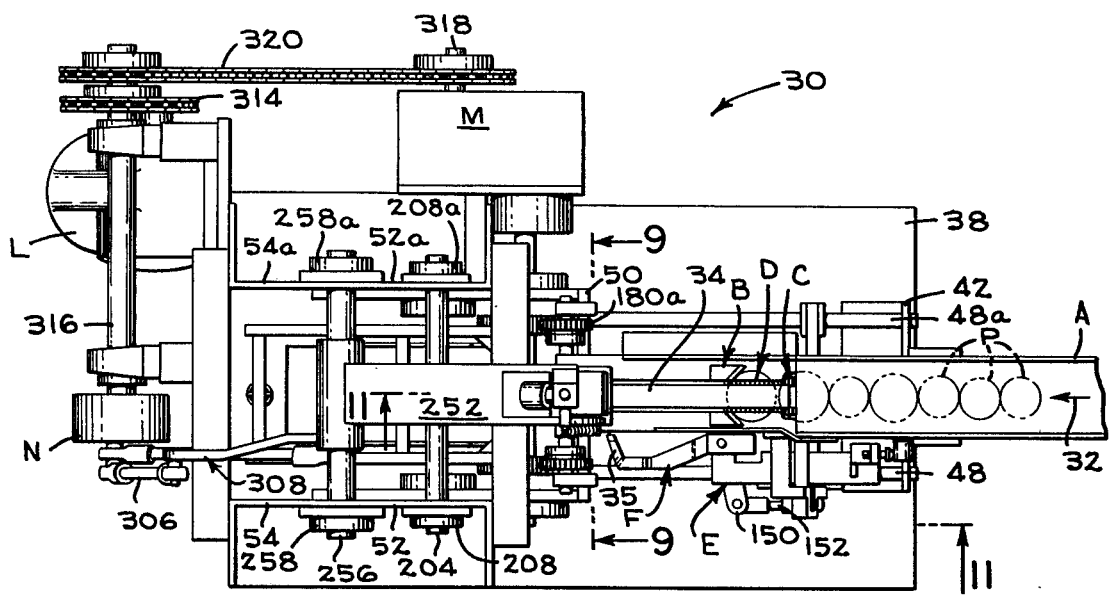
FIG_4
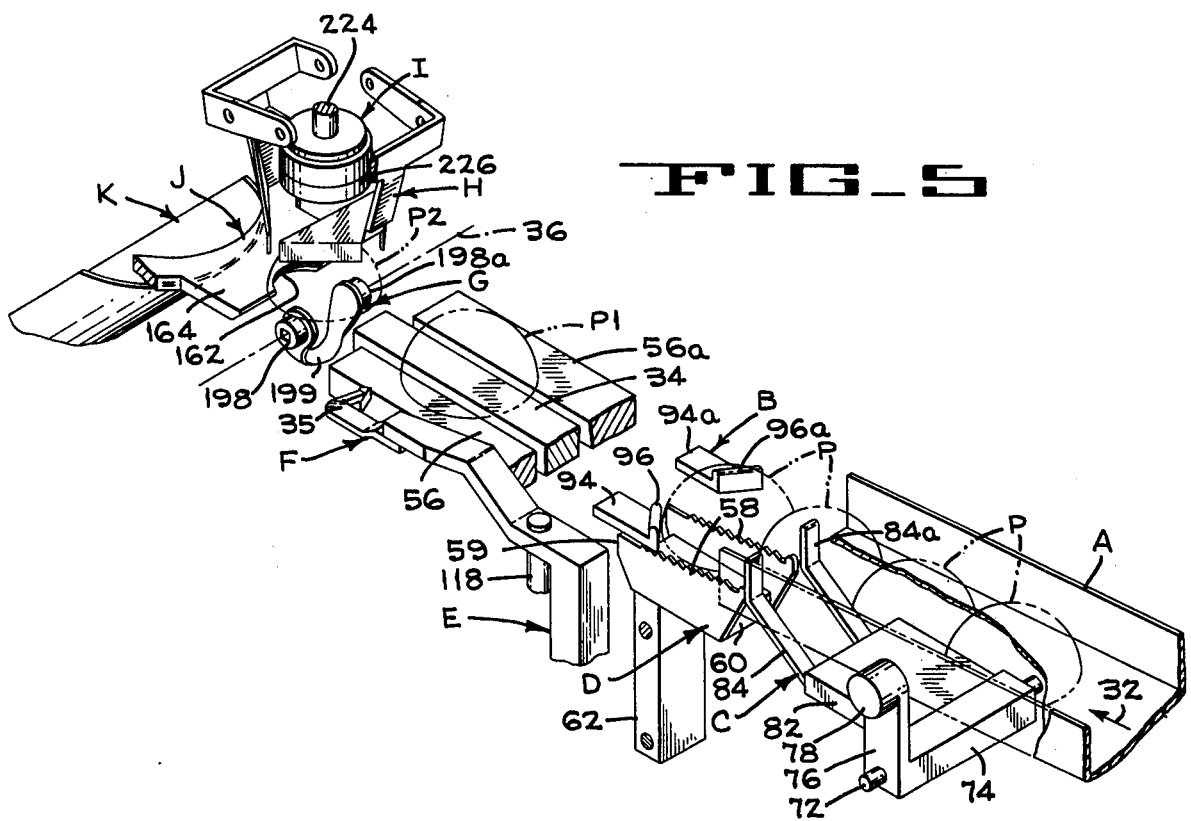
FIG_5

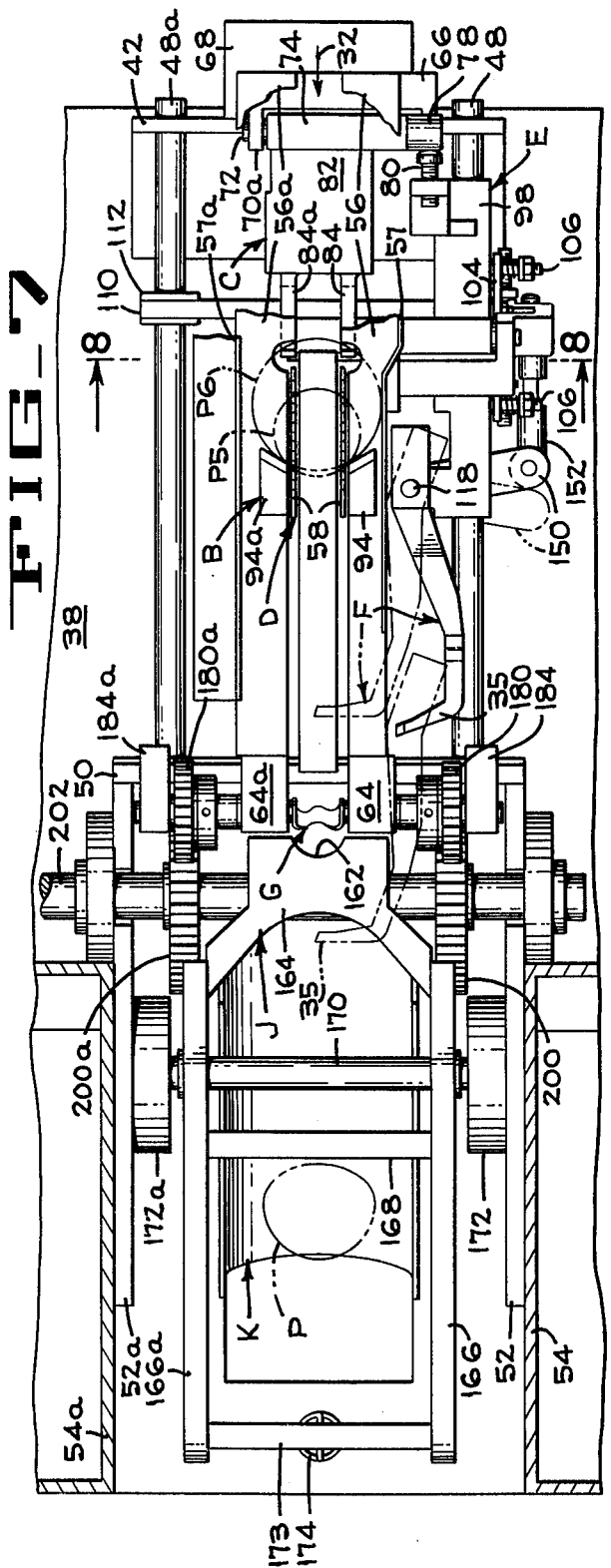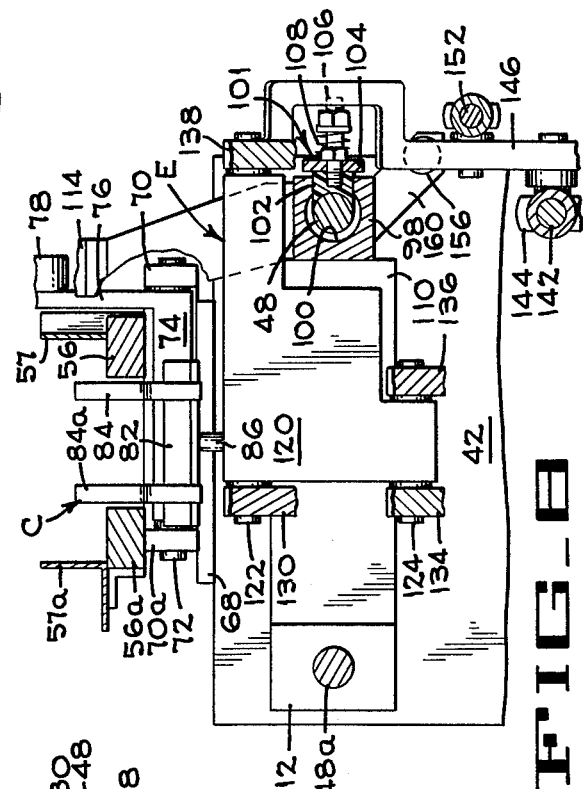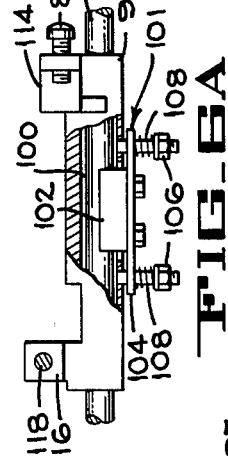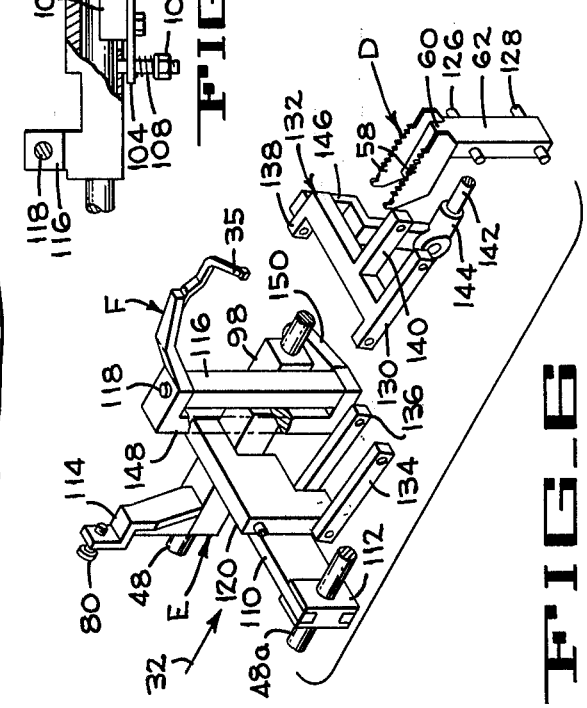

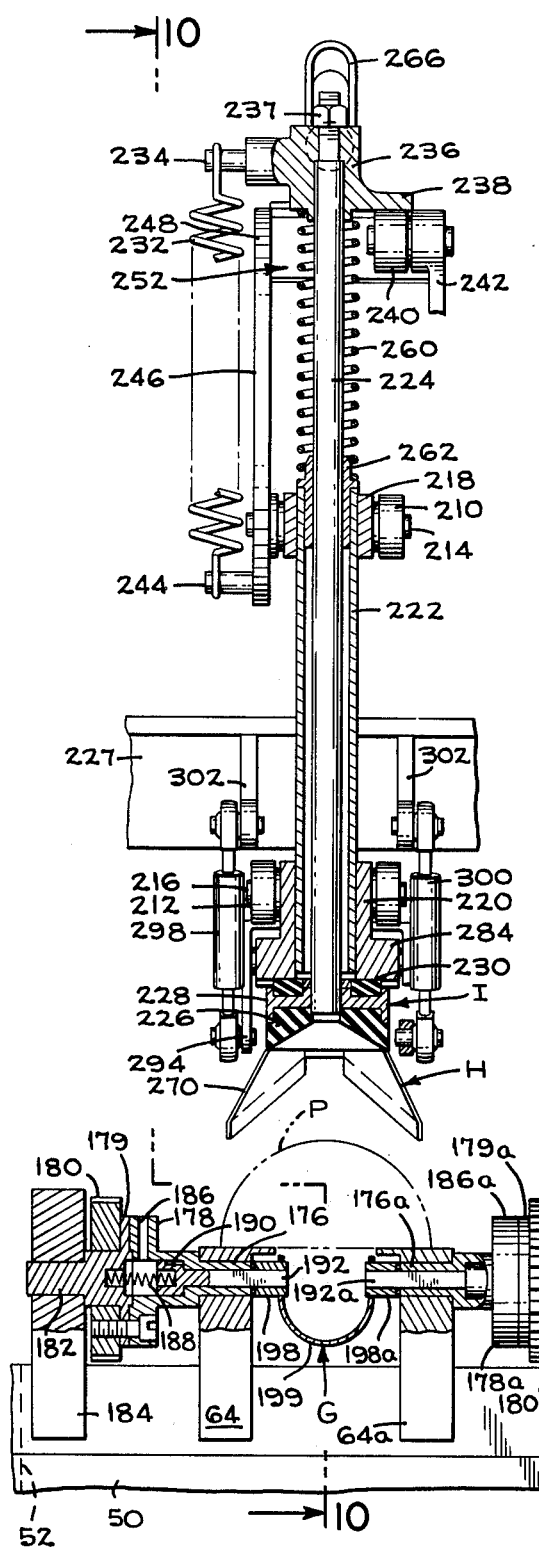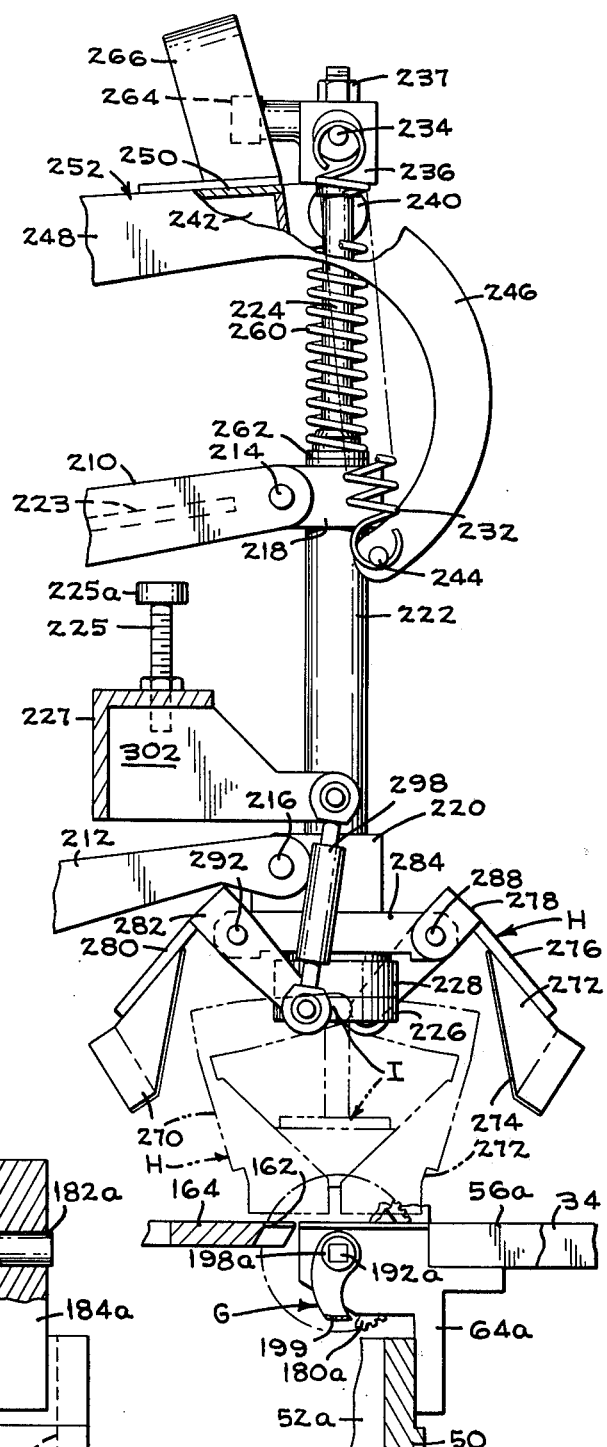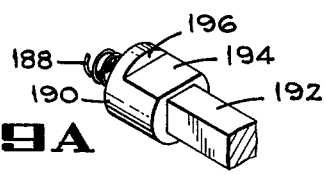

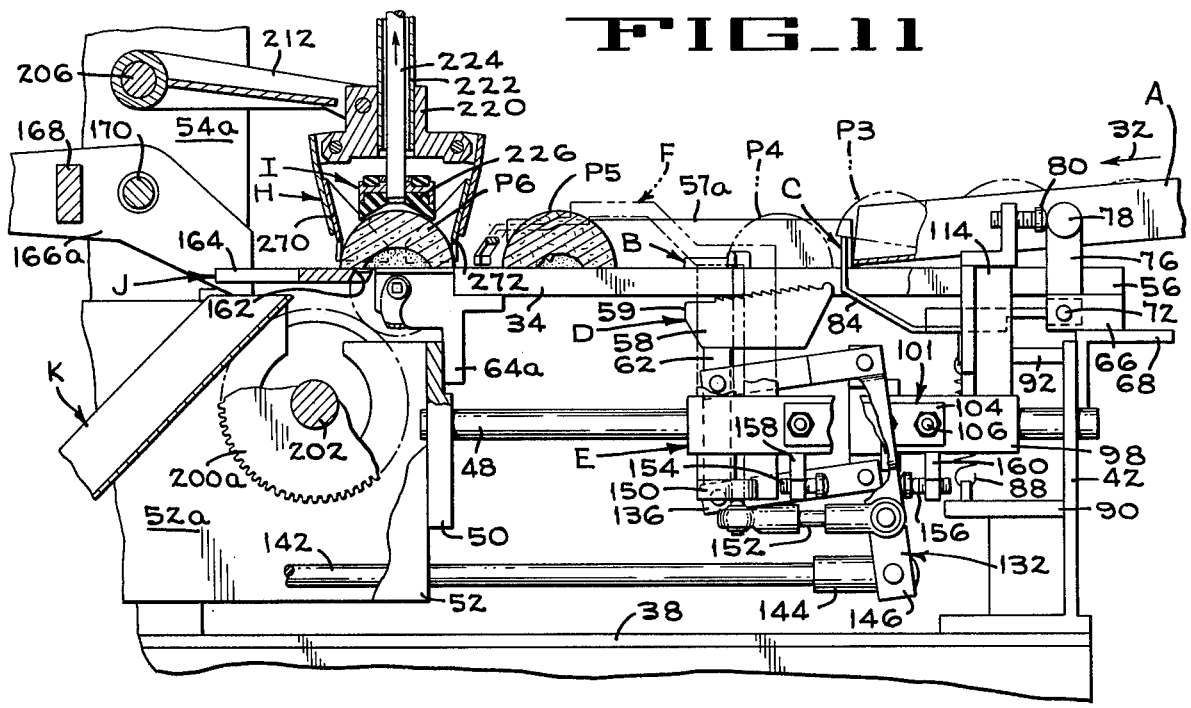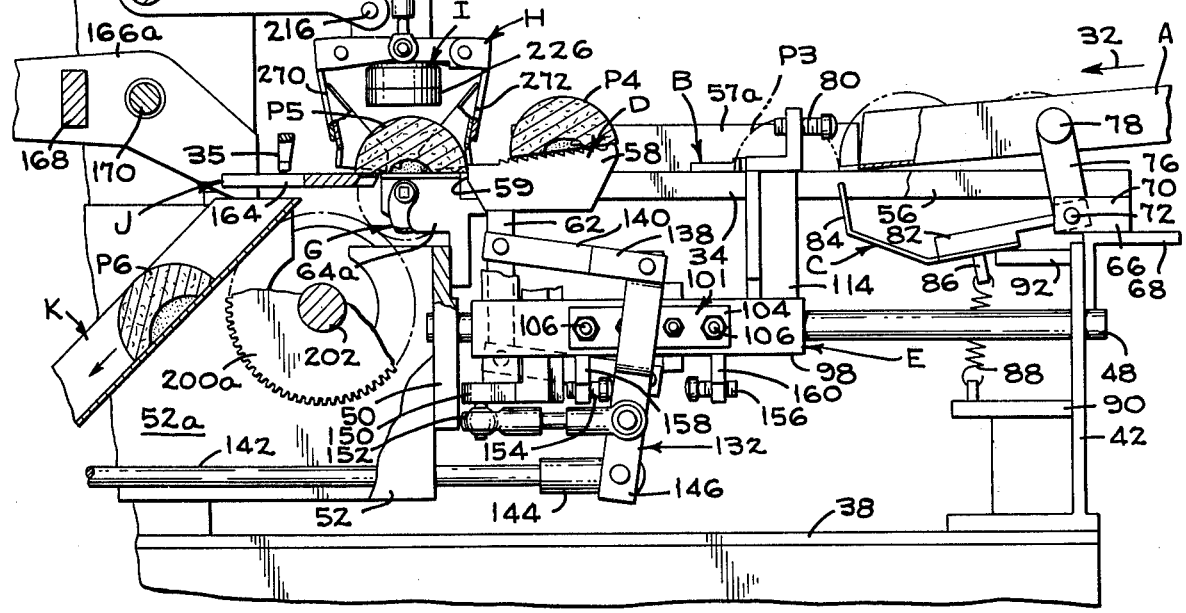

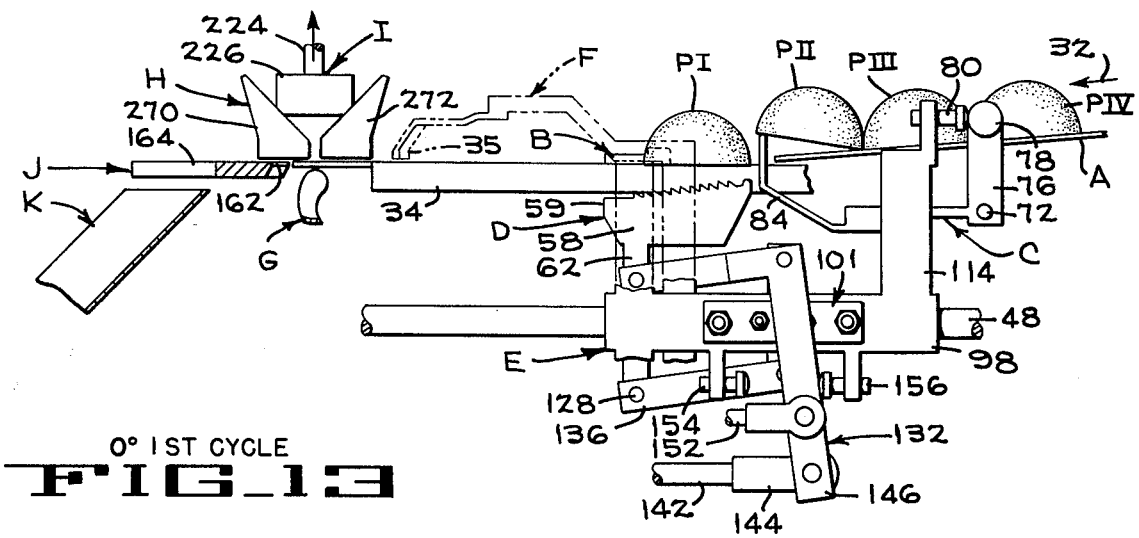
0° 1ST CYCLE
FIG_13
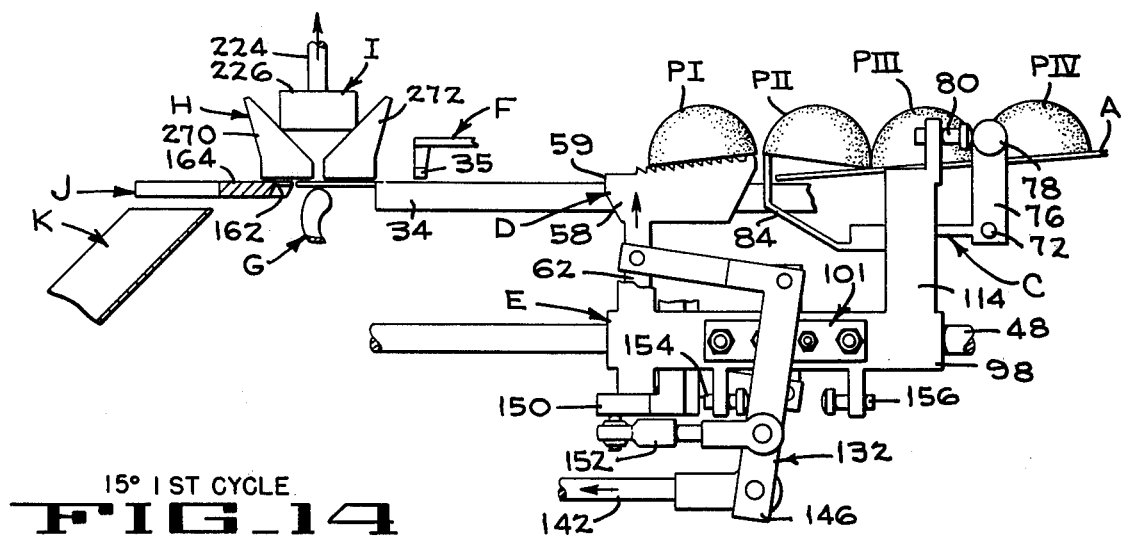
15° 1ST CYCLE
FIG_14
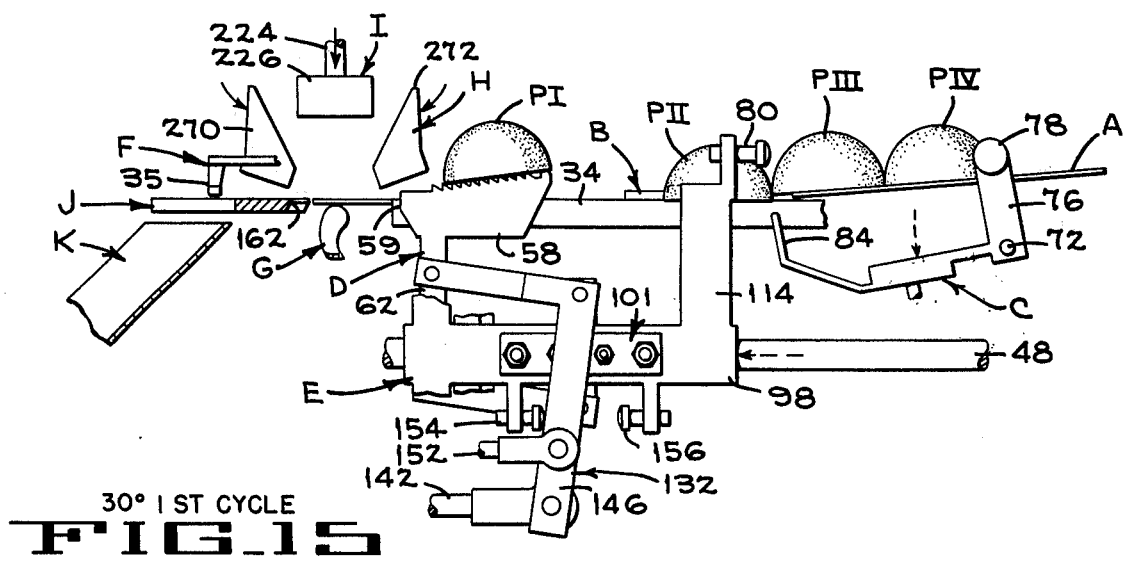
30° 1ST CYCLE
FIG_15

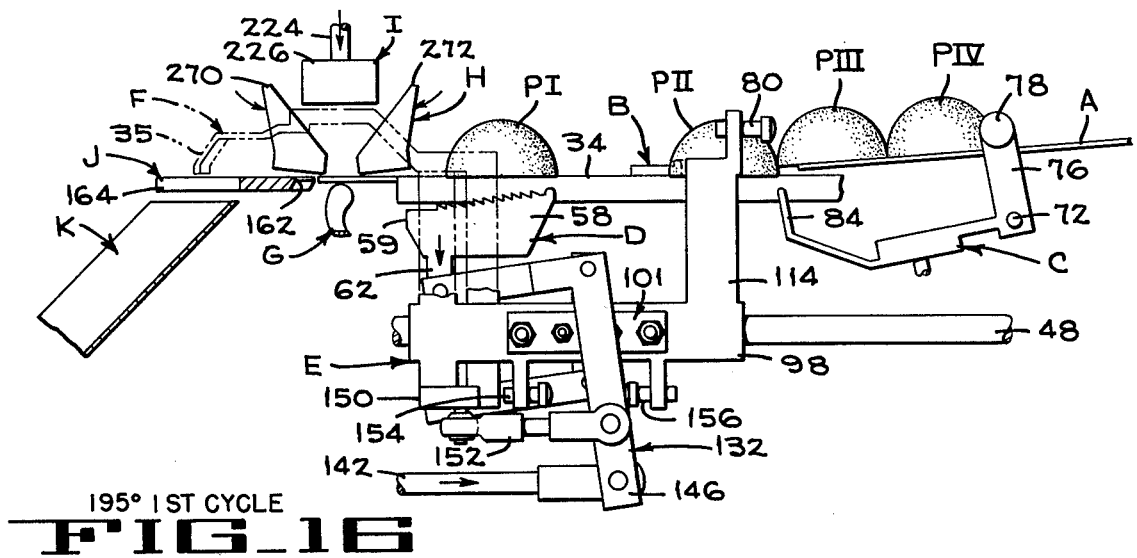
195° 1ST CYCLE
FIG_16
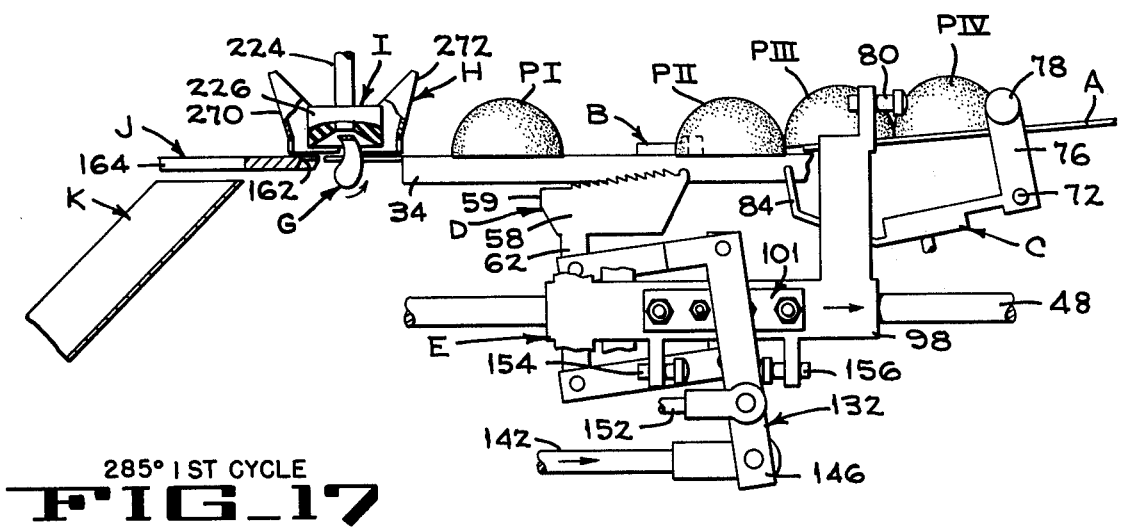
285° 1ST CYCLE
FIG_17
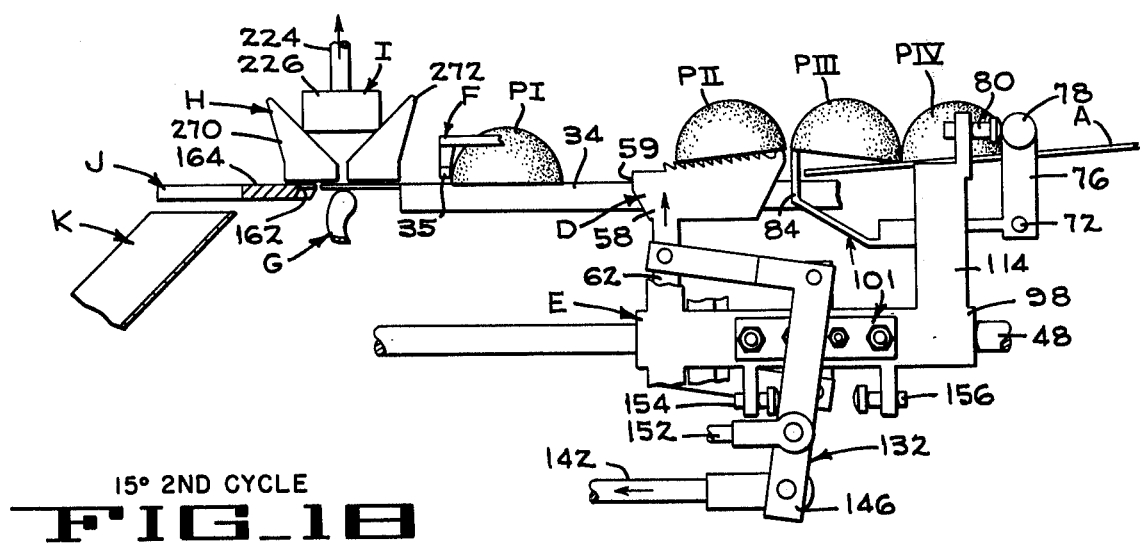
15° 2ND CYCLE
FIG_18

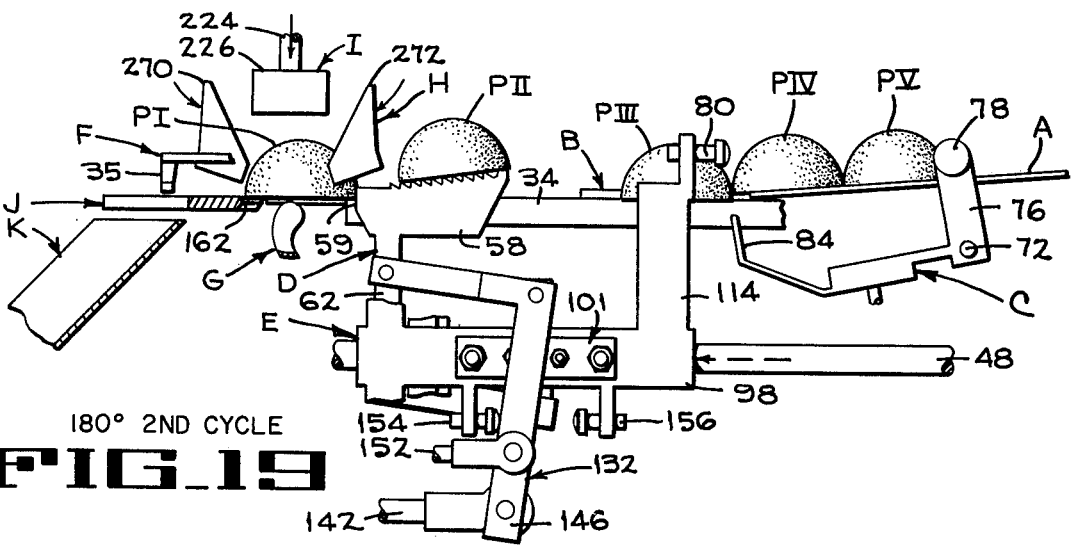
180° 2ND CYCLE
FIG_19
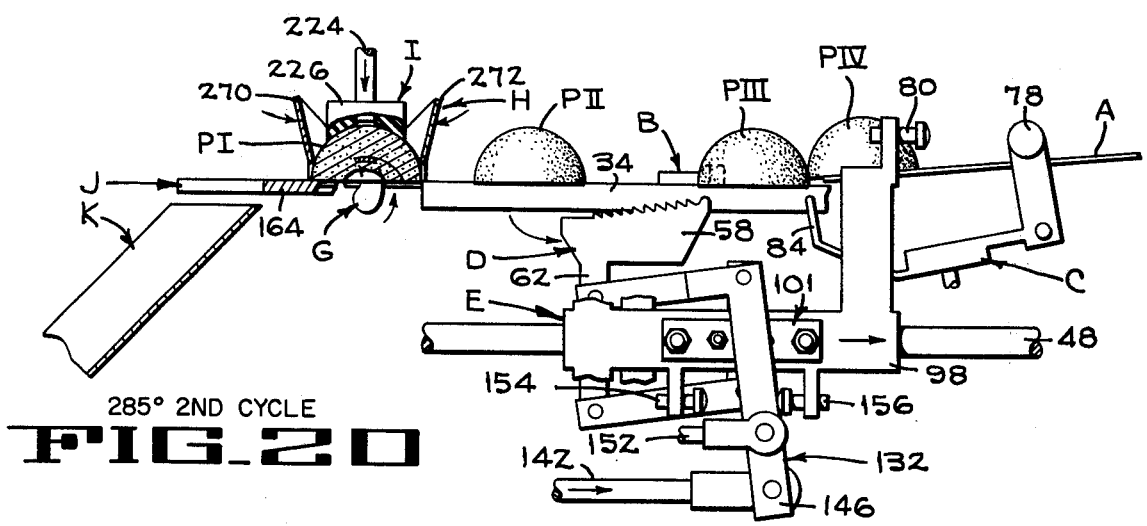
285° 2ND CYCLE
FIG_20
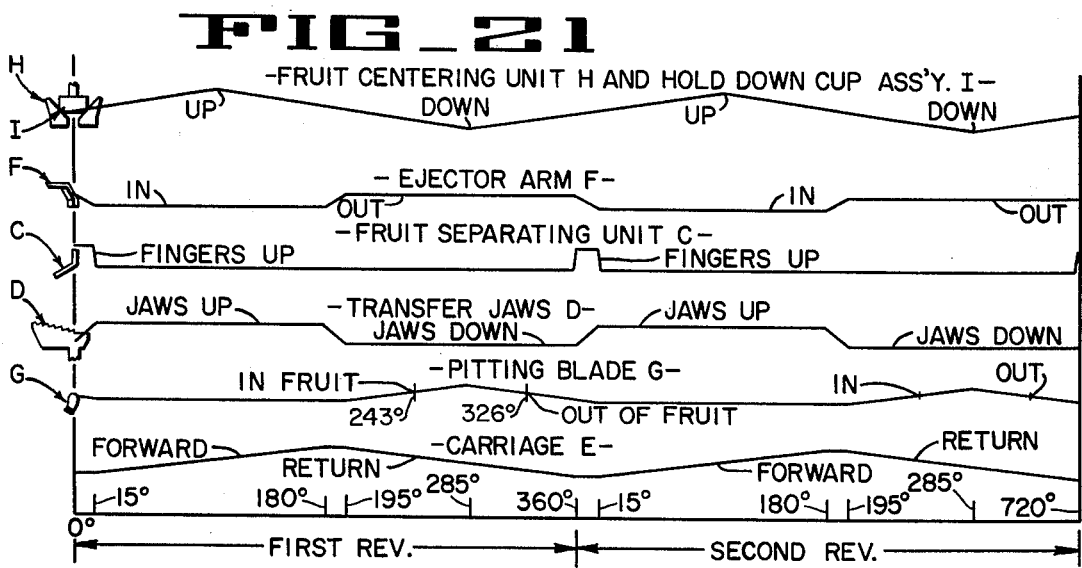
FIG_21

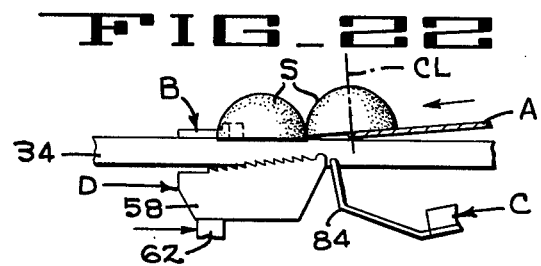
FIG_22
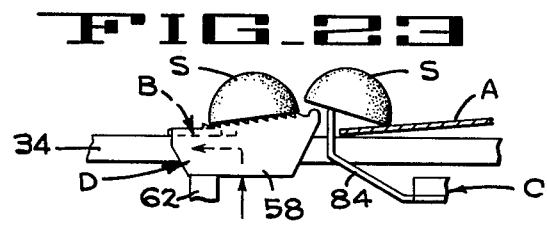
FIG_23
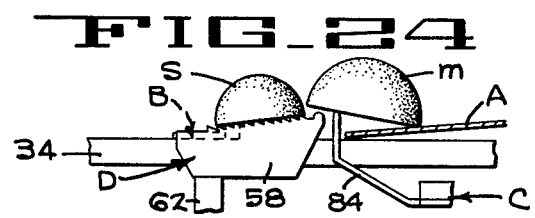
FIG_24
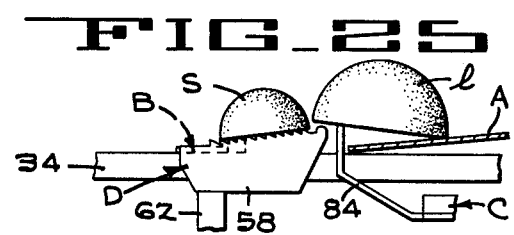
FIG_25
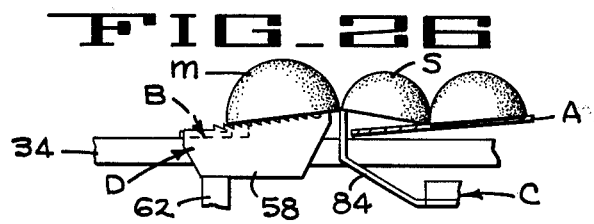
FIG_26
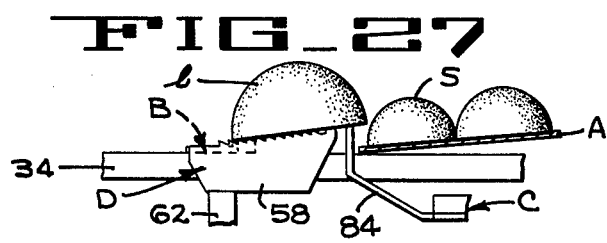
FIG_27

PEACH REPITTING MACHINE

BACKGROUND OF THE INVENTION

The field of the present invention is in peach pitting machines, for example of the type disclosed in the U.S. Pat. No. 2,376,526. In later developments of the patented machine, as well as in other similar types of peach pitting machines, a whole peach is cut in half along its suture plane, and the pit half is removed from each pit half by either making a cut around the curved side of the pit half to free the pit, or by pulling, twisting, or pushing the pit half away from the fruit. Among the many patented improvements of the basic Thompson machine, the cutting type of pitting operation is disclosed in U.S. Pat. Vadas et al No. 3,045,731, issued Feb. 17, 1958, and a pushing type of pitting operation is disclosed in my U.S. Pat. No. 3,225,904, issued on December 28, 1965.

A problem which is common to prior art peach pitting operations is that the pit of the peach may be split either before or during the pitting operation, because the pits are sometimes weak and easily broken. As a result, the pitting operation may not remove all of the pit. Since the peach halves cannot be repitted in the same machine which initially does the pitting, it has been customary to manually segregate the defectively pitted peach halves and cut out the pit fragments by hand. This can be costly because of the high ratio of defective pits (either weak or split) sometimes found in large lots of peaches delivered to the processor.

SUMMARY OF THE INVENTION

The peach repitting machine of the present invention provides a relatively inexpensive automatic system for removing peach fragments from half peaches which may have been incompletely pitted by the primary peach pitting machines in a processing line. For this purpose, the machine includes an automatic shuffle feeding mechanism which delivers the peach halves one by one to a hold-down system which centers each peach half, flat side down, over a U-shaped pitting knife. The feeding mechanism, hold down system, and a knife mounting arrangement which allows easy knife replacement are structural features which contribute to the low cost, reliability, ready maintenance and utility of the peach repitting machine. A further feature is that the shuffle feeding system automatically accommodates any intermixed sequence of fruit halves of different sizes after they are segregated from properly pitted fruit, and that the overall machine is completely automatic in operation. Thus, the repitting machine of the present invention can be readily incorporated into a cannery system wherein a plurality of primary pitting machines simultaneously pit peaches over a wide range of sizes, and this makes possible an overall peach pitting system which substantially eliminates hand labor in the preparation of the fruit for canning.

BRIEF DESCRIPTION OF THE DRAWINGS

FIG. 1 is a schematic perspective of the peach repitting machine of the present invention.

FIG. 2 is a schematic side elevation of the reverse side of the machine shown in FIG. 1.

FIG. 3 is a schematic isometric of the major drive components of the machine.

FIG. 4 is a schematic top plan of the apparatus shown in FIG. 2, but reversed right to left.

FIG. 5 is a schematic isometric of the major elements which feed, separate, center, grip, pit and eject the peach halves.

FIG. 6 is a schematic isometric of a horizontal reciprocable carriage for moving the fruit through the repitting machine.

FIG. 6A is a fragmentary plan view of a guide member for the reciprocable carriage of FIG. 6 with portions being broken away.

FIG. 7 is an enlarged schematic horizontal section taken substantially along lines 7—7 on FIG. 2, the section being reversed left to right, and certain drive train parts being omitted for clarity.

FIG. 8 is a vertical schematic section taken along lines 8—8 on FIG. 7.

FIG. 9 is an enlarged schematic vertical section taken substantially along lines 9—9 on FIG. 4.

FIG. 9A is an enlarged fragmentary perspective of the driving member for the pitting blade.

FIG. 10 is a schematic view, partly in elevation and section, taken substantially along lines 10—10 on FIG. 9.

FIG. 10A is a perspective view of the centering unit.

FIG. 11 is a vertical schematic section, partly in elevation and partly broken away, taken substantially along lines 11—11 on FIG. 4.

FIG. 12 is a section similar to FIG. 11, but in a different operational position.

FIGS. 13–20 are schematic sections, similar to FIGS. 11 and 12, showing successive operational positions and functions during an operating cycle.

FIG. 21 is a timing diagram which outlines the functions illustrated in FIGS. 13–20.

FIGS. 22–27 include the fruit transfer jaws which appear in FIGS. 13–20, and illustrate the manner in which intermixed fruit of various sizes are separated and fed.

DESCRIPTION OF A PREFERRED EMBODIMENT

The peach repitting machine 30 (FIG. 1) of the present invention has the purpose of reclaiming peach halves which have been incompletely pitted in a peach processing line. In one type of peach pitting machine and procedure, whole peaches are bisected along their suture planes, and the pits are removed by a knife that cuts around the pit. It sometimes happens that portions of the pit remain in the peach half after the pitting operation, and these must be later manually removed with a spoon-shaped knife because the pitting machine cannot handle half peaches. The peach repitting machine 30 automatically repits the peach halves after the defectively pitted halves have been manually segregated from the peach halves which do not require a repitting operation.

As shown in FIGS. 1–5 (with primary reference to FIG. 5), the main components of the repitting machine 30 include an inclined vibratory feed chute A which is fed with peach halves P, placed flat side down, to move down the chute in the direction of the arrow 32. Near the lower end of the feed chute A is a fixed fruit stop B which stops the leading incoming peach half P so that successive incoming peach halves build up in a continuous backlog. This backlog of fruit, however, is not essential to the repitting operation, and peach halves may be fed intermittently, singly, or continuously to the chute. The sizes of the peach halves can vary considerably without affecting the feeding and repitting operations.

Between the fruit stop B and the feed chute A is a fruit separating unit C, which operates to hold back the second and subsequent peach halves P when the leading peach half is lifted and moved forward by saw-toothed transfer jaws D.

The transfer jaws D are mounted on a reciprocable carriage E (FIGS. 1 and 2). Also mounted on the carriage E is a pivotable ejector arm F which positively removes the peach halves after they are pitted. Referring again to FIG. 5, the peach half engaged by the transfer jaws D is initially lifted above a central fruit support rail 34 by the jaws, and is deposited on the rail at the position shown by the phantom line peach half P-1 when the carriage E is at its downstream limit of movement.

Ejector arm F is so mounted to the carriage E that soon after the carriage begins to move downstream, the arm pivots to position a lateral pusher 35 into the path of movement of the peach halves. The operation of the pusher 35 will be described in more detail presently.

The carriage E then returns the transfer jaws D to lift and transfer the next peach half, and in so doing, the downstream ends of the transfer jaws D push the peach half P-1 to a pitting station that includes a U-shaped pitting blade G in vertical alignment with a vertically movable fruit centering unit H, and a hold-down cup assembly I. In this position, indicated by the phantom line peach half P-2, the peach half is supported by means including the downstream end portion of the rail 34, and the adjacent upstream end portion of a resiliently biased shear plate unit J.

After the centering unit H moves down and accurately indexes the peach half P-2 over the pitting blade G, the cup assembly I is moved down to hold the peach half P-2 while the pitting blade is driven one revolution about its turning axis 36 to sever the pit. The shear plate unit J will rebound from the force of the pitting blade if a pit fragment jams between the pitting blade and the shear plate.

Returning to the ejector arm F (FIG. 5) the pusher 35 on the free end of the ejector arm moves between the peach halves P-1 and P-2 soon after the carriage E starts to move downstream. Thus, a peach half which was previously aligned with, and pitted by, the pitting blade G will be ejected over the shear plate J, as will each subsequent peach half in turn, and the pitted peach halves drop into a discharge chute K for collection. Briefly referring to the main drive components for later reference, the peach repitting machine 30 (FIGS. 1-4) is driven by a gearhead motor L that powers a gear box M for driving the pitting blade G, and the other drive motions are obtained by linkages eccentrically connected to a driving disc N.

THE FEED CHUTE A

With more detailed reference to the structure illustrated, a table 38 (FIG. 1) is supported by legs at a convenient elevation. A cantilever arm 40 underlies the feed chute A and projects from a vertical wall 42 on the table 38. In order to provide small amplitude vibrations to the feed chute so that the peach halves will gravitate to its lower end, a conventional electromechanical vibrator 44 is mounted on the arm 40 and coupled to a bracket 46 which supports the feed chute.

In the description following, similar parts to the left of the path of the peach halves are given whole numerals, and those to the right are given the same numerals with the suffix a.

The wall 42 is apertured to mount fixed, laterally spaced guide rods 48 and 48a that slidably mount the carriage E. To support the other ends of the guide rods, they are mounted in a transverse wall 50 which is fixed to a plate 52. At the left side of the machine, the plate 52 is secured to the inside surface of an upright side plate 54 which is rigid with the table 38. At the other side of the machine (see FIG. 4) the wall 50 is secured to a plate 52a which is fixed to the inside surface of an upright side plate 54a.

THE TRANSFER JAWS D

For supporting the peach halves beyond the lower end of the feed chute A (FIGS. 3-5), the central support rail 34 is straddled by outer rails 56 and 56a which are spaced from rail 34 to provide coextensive clearance slots, and which support sheet metal fences 57 and 57a (FIGS. 7 and 8) to retain and guide the peach halves. As most clearly shown in FIGS. 5-7, the transfer jaws D comprise two laterally spaced blades 58 which operate in the slots between the rails 34, 56 and 56a. The blades 58 are provided with saw-tooth or serrated upper edges which penetrate and provide firm gripping support of the peach halves, so as to positively transfer the peach halves as the carriage E moves the transfer jaw between the feed position adjacent the feed chute A and the delivery position near the pitting blade G. To mount the blades 58, they are secured to a lateral leg 60 (FIG. 6) of a parallelogram link 62. As later described, the link 62 moves the transfer jaws D up and down to engage and disengage the peach halves while the carriage E reciprocates.

Support for the rails 56 and 56a is best shown in FIG. 10 for the rail 56a, and includes a generally L-shaped bracket 64a on the transverse wall 50 for one end of the rail, and at the other end a block 66 that rests on an angle bar 68 which is secured to the end wall 42. A similar bracket 64 for the rail 56 appears in FIG. 7, and fragments of both brackets 64 and 64a appear in FIG. 9. FIG. 10 shows the entire side profile of the bracket 64a, which is the same configuration as the bracket 64.

THE FRUIT STOP B AND THE FRUIT SEPARATING UNIT C

FIGS. 5, 7 and 8 illustrate the mounting and structure of the fruit separating unit C. The above mentioned block 66 (FIG. 8) is provided with spaced ears 70 and 70a for mounting a pivot shaft 72. Now referring to both FIGS. 5 and 8, it will be seen that the fruit separating unit C includes a mounting bar 74 which is pivotally mounted on the shaft 72 between the ears 70 and 70a. At the left side of the machine the mounting bar 74 is provided with an upstanding crank arm 76 having a round abutment 78. The carriage E (FIG. 7) carries a later mentioned striker bolt 80 which strikes the abutment 78 and pivots the crank arm 76 when the carriage is retracted to its upstream limit of movement.

Continuing with reference to FIGS. 5, 7, 8 and 11, the mounting bar 74 has a shelf 82 facing downstream, and laterally spaced fruit lifting fingers 84 and 84a. As shown in FIG. 7, the fruit lifting fingers are longitudinally aligned with the serrated blades 58 (FIG. 5) of the transfer jaws D. In FIGS. 5 and 11, the fingers 84 and 84a are seen to have free end portions which are substantially vertical when the striker bolt 80 on carriage E moves the crank arm 76 to a vertical position at the rearward limit of carriage movement. The function resulting from the lifting of the fruit lifting fingers 84 and 84a is that a peach half P3, FIG. 11, which was formerly in abutting relation with a peach half P4 that is against the fruit stop B, has its downstream end lifted to a position where it will be clear of the transfer jaws D when the jaws are lifted; these movements are later described in detail in conjunction with FIGS. 13–20 showing the operating sequence.

In order to lower the fruit lifting fingers 84 and 84a (FIGS. 5 and 12) below the path of the peaches when the carriage E moves a peach forward so that the previously elevated peach half will be deposited on the rails 34, 56 and 56a, the shelf 82 which connects the fingers has a depending pin 86 connected to a tension spring 88 having its lower end anchored to a bracket 90 on wall 42. The downward pivotal movement of the fruit separating unit C (FIG. 12) begins as the striker bolt 80 releases the crank arm 76, and is limited by an abutment 92 on the wall 42.

As shown best in FIGS. 5 and 7, the fruit stop B comprises base plates 94 and 94a mounted on the fruit support rails 56 and 56a, and an upstanding, rounded wall 96 and 96a on the upstream ends of the base plates. The two walls form a diverging throat which will arrest small peaches P5 (FIG. 7) and large peaches P6 in approximately the same position over the (lowered) transfer jaws D when the latter are in retracted position with the carriage E.

THE CARRIAGE E

FIG. 6 is an exploded, schematic isometric view of the reciprocable transfer carriage E. At the outset, it should be noted that FIG. 6 also includes the previously mentioned carriage guide rods 48 and 48a, the transfer jaws D and the parallelogram link 62 which supports the jaws, the ejector arm F, and the striker bolt 80 that causes lifting of the fruit separating fingers 84 and 84a (FIGS. 7, 11 and 12). The primary guiding member of the carriage E, mounted on the guide rod 48, is an elongate slide bar 98 of square cross section having a coextensive bore 100 (FIGS. 6A and 8). Each end portion of the bore 100 is provided with a bushing, not shown, that slides on the guide rod 48.

Intermediate the ends of the slide bar 98, its outer side is cut through for mounting a friction drag mechanism 101 including a friction block 102 which has a semicircular inner surface slidably engaged with the guide rod 48. Friction block 102 is resiliently biased against the guide rod to provide an adjustable dragging force which inhibits movement of the carriage E, for a lost motion connection which is later described. As shown in FIG. 6A, the friction block 102 is bolted to a plate 104. Stud bolts 106 are anchored in the slide bar 98 and extend through larger apertures in the plate 104 so that a compression spring 108 on each stud bolt, mounted between the plate and a nut on the bolt, may be adjusted to provide the required drag on the carriage E by the force of the springs 108.

Extending at 90 degrees from the inner surface of the slide bar 98 is a beam 110 having a forked end engaged with a notched bearing block 112 that is slidable on the guide rod 48a at the other side of the machine. Also integral with the slide bar 98 is a pedestal 114 for supporting the striker bolt 80, and a vertical post 116 which supports a pivot shaft 118 for pivotally mounting the ejector arm F as later described.

Rigidly mounted on the downstream face of the beam 110 is a vertical plate 120, one edge of which forms one side of a parallelogram linkage wherein the opposite side is the parallelogram link 62 that carries the transfer jaws D. Thus, the plate 120 is provided with an upper pivot shaft 122 and a lower pivot shaft 124. Link 62 is provided with upper and lower pivot shafts 126 and 128, respectively, that have the same vertical spacing as the first mentioned pivot shafts.

Connected to the upper shafts 122 and 126 at the right side of the machine is a link 130 that is integrally formed on a transfer jaw lift frame 132 which moves the transfer jaws D up and down, and which also provides a lost-motion drive connection for the carriage E, as later described. The lower shafts 124 and 128 are connected by two laterally aligned links 134 and 136, thus completing a parallelogram frame which will maintain the link 62 supporting the transfer jaws vertical as the lift frame pivots about the axes of the vertically fixed pivot shafts 122 and 124 carried by the reciprocating carriage E. In order to stabilize the transfer jaw lift frame 132 and the jaw link 62, the lift frame is provided with an ear 138 at the left side of the machine that is connected to the other end of the upper pivot shaft 122 (FIG. 8). Further, the lift frame is provided with a rigid arm 140, which, like the link 130, is connected to the other end of the upper pivot 126 (FIG. 12) for the transfer jaws. Fore and aft movement of the carriage E is effected by a reciprocating driving link 142, (later described) that is provided with a ball joint connector 144 pivoted to the lower end of a depending drive arm 146 integral with the lift frame 132. In FIG. 8, it will be noted that the drive arm 146 has a C-shaped offset to provide ample clearance from the plate 104 of the adjustable carriage drag mechanism 101 earlier described.

THE EJECTOR ARM F

Now with reference to FIGS. 4–7, it has previously been mentioned that the ejector arm F is pivotally mounted on the pivot shaft 118 of the carriage E, and that its free end has a pusher arm 35 which ejects the pitted peach halves into the discharge chute K. As shown in FIG. 6, the ejector arm F further includes a vertical arm 148 with lateral portions pivoted on the shaft 118 and embracing the top and bottom of the post 116 on the carriage E. At the bottom of the post, the ejector arm is formed with a laterally extending crank arm 150 for pivoting the ejector arm so that its pusher 35 (FIG. 7) moves between the full and phantom line positions thereof as the crank arm 150 moves between the full and phantom line positions. This pivotal movement results from sliding movement of the carriage E, as next described, after noting that the carriage slide bar 98 is notched to clear the vertical pusher arm 148 (FIG. 6) when the FIG. 7 phantom line position is attained.

As best shown in FIGS. 11 and 12, the drive arm 146 of the transfer jaw lift frame 132 and the crank arm 150 of the ejector arm F are connected by a link 152 provided with ball joint connectors. Thus, when the drive link 142 (FIG. 11) moves toward the feed end of the machine (to the right) the drive link 146 pivots about the axis of the upper pivot shaft 122, pulls the link 152, and as shown in FIG. 7, moves the pusher arm 35 on the free end of the ejector arm F to its full line position, out of the path of the peaches. Conversely, when the drive link 142 (FIG. 12) moves toward the discharge end of the machine (to the left), the drive link 146 pivots about the axis of the upper pivot shaft 122, and moves the pusher arm 35 to the phantom line position of FIG. 7 and into the path of the peaches. As presently described, the timing is so arranged that the pusher arm 35 moves laterally before and after its movement longitudinally of the machine.

At the same time the ejector arm F is pivoted as above described, the transfer jaw lift frame 132 (FIGS. 11 and 12) actuates the parallelogram link 62 which carries the fruit transfer jaws D. However, there is a lost motion driving connection between the drive link 142 and the carriage E so that there is a time lag of the carriage movement relative to the ejector arm and transfer jaw movements. For this purpose, the drive arm 146 of the lift frame 132 pivots about the axis of the pivot shaft 122 in a vertical plane which includes abutment bolts 154 and 156 that are spaced in the direction of movement of the carriage E. As best shown in FIGS. 8, 11 and 12, the underside of the slide bar 98 has rigid depending arms 158 and 160 which carry the abutment bolts.

Accordingly, when the drive link 42 moves upstream from the FIG. 12 position to the FIG. 11 position, the drive arm 146 initially swings into contact with the abutment bolt 156 and lowers the transfer jaws D before the carriage E starts to move. In attaining the FIG. 11 position, the striker bolt 80 on the pedestal 114 of the carriage E contacts the abutment 78 of the fruit separating unit C to raise the fruit lifting fingers 84 and 84a. The purpose of the carriage drag mechanism shown in FIG. 6A will now be evident; by adjusting the pressure of the friction block 102 against the guide rod 48, the lift frame 132 can be made to positively pivot about the axis of the pivot shafts 122 and 124 before the carriage E is moved in either direction.

When the drive link 142 (FIG. 11) moves to the left from the position shown, the first operational conditions which are effected are that the transfer jaws D elevate into contact with the peach half P4, lifting the peach half, and the ejector arm F pivots to place its pusher arm 35 between the peach halves P5 and P6. Peach halves P5 and P6 are respectively adjacent the pitting blade G, and centered over the pitting blade, and were so positioned during a previous operating cycle. The drive arm 146 then contacts the abutment bolt 154 and the carriage E starts to move downstream.

As soon as the carriage begins to move, the striker bolt 80 is moved downstream away from the crank arm 76 of the fruit separating unit C so that the spring 88 and the weight of the fruit lower the fruit lifting fingers 84, 84a to deposit the peach half P3 onto the central rail 34 and the side rails 56 and 56a (FIG. 7). When these conditions are attained, the peach P3 is slid forward by the succeeding peaches in the feed chute and comes to rest against the fruit stop B, where the peach half P4 was formerly positioned.

Meanwhile, the peach half P4 has been elevated above the support rails and is supported solely by the transfer jaws D. At the downstream limit of movement of the carriage E, as shown in FIG. 12, the peach half P4 reaches a position formerly occupied by the peach half P5 (FIG. 11) but is still elevated out of contact with the support rails 34, 56 and 56a. During this downstream movement of the transfer jaws D, the leading vertical ends 59 of the serrated jaw blades 58 pushed the peach half P5 over the pitting blade G. It will be understood that at the time of pushing the peach half P5, the fruit hold down cup assembly I and the fruit centering unit H were in elevated positions both to clear the peach half P5 and to allow discharge of the peach half P6 (FIG. 11) after it was pitted. Thus, the pitting operation occurs while the transfer carriage E is in transit from the FIG. 12 to the FIG. 11 position, and with a single revolution of the pitting blade G as presently described. While the fruit hold down cup assembly I and the fruit centering unit H were elevated as aforesaid, the ejector pusher arm 35 discharged the pitted peach half P6 (FIG. 12) into the discharge chute K. All of the foregoing operational movements are sequentially illustrated and described later in conjunction with FIGS. 13–20.

THE SHEAR PLATE ASSEMBLY J

The shear plate assembly J (FIGS. 5, 7, 11 and 12) is provided for the purpose of yieldably supporting the downstream sector of the peach halves during the pitting operation, because it sometimes happens the pit may be contacted by the pitting blade and broken, or is already broken, or breaks when the whole fruit is sawed in half. Therefore, pit fragments may be carried around by the pitting blade G and could otherwise break the pitting blade by jamming against the shear plate. Thus, the pitting blade G (FIGS. 11 and 12) turns counterclockwise, and will carry any loose pit fragments downward against the arcuate edge portion 162 (FIG. 7) of a shear plate 164. The shear plate 164 is connected to horizontal support arms 166 and 166a, fastened together by a tie bar 168, which are pivotally mounted on a cross shaft 170. The cross shaft 170 is mounted in bearing blocks 172 and 172a (FIG. 7) that are secured to the inner faces of the plates 52 and 52a, and the free ends of the arms 166 and 166a are each connected to a rod 173 coupled to a tension spring 174 that is anchored to the table 38. Stop means, not shown, hold the shear plate 164 horizontal, and the shear plate 164 may pivot downward about the axis of the cross shaft 170 if pit fragments jam between the pitting blade G and the shear plate during a pitting operation, thus preventing breakage of the pitting blade. When the jam is cleared, the spring 174 restores the shear plate 164 to its normal horizontal operating position.

THE PITTING BLADE G

A feature of the present invention is that the pitting blade G may be quickly installed or removed, as next described in conjunction with FIGS. 9 and 10. As previously stated, the loop type pitting blade is known as to its general mode of operation. The brackets 64 and 64a (FIG. 7) which support the downstream ends of the support rails 56 and 56a are apertured for rotatably mounting hollow shafts 176, 176a (FIG. 9), respectively. The shafts are integral with coupling flanges 178, 178a that abut the inner faces of flanges 179, 179a. Both pairs of flanges are bolted to the inner faces of pinion gears 180, 180a. Stub shafts 182, 182a of the flanges 179, 179a are rotatably journalled in brackets 184, 184a projecting from the transverse wall 50.

The coupling flange 178 is provided with a radial aperture 186 opening into a cylindrical axial bore in which is mounted a compression spring 188. Spring 188 is mounted in a socket in the flange 179, and in a socket in a cylindrical head 190 formed on the inner end of a square shank 192 for mounting one hub of the pitting blade G. The square shank 192 extends through and projects from a square bore in the hollow shaft 176 and the shank 192 is thus rotatably locked to the gear 180.

As shown in FIG. 9A, the cylindrical head 190 of the shank 192 is provided with a relief 194 which leaves an upstanding abutment 196. The relief and abutment are in the same axial plane as the radial aperture 186 (FIG. 9). Thus, the inner end of the square shank 192 may be pushed toward the gear 180, against the force of the spring 188, to clear a square-aperture mounting hub 198 brazed to one arm of the pitting blade G. A pin (not shown) then inserted in the aperture 186 will seat on the relief 194 and maintain the square pitting blade mounting shank 192 clear of the blade mounting hub 198. The other hub 198a is similarly mounted on a depressible square mounting shank 192a, and the two hubs are secured to a generally semicircular knife blade portion 199 having a sharpened leading edge. With the described mounting arrangement, both blade mounting shanks can be readily retracted and held there so that the pitting blade G can be quickly removed and replaced.

The pitting blade G (FIG. 3) is driven by means including the above mentioned gears 180 and 180a, and gears 200, 200a respectively meshed therewith and mounted on the output shaft 202 of the gearbox M, as later described.

THE HOLD DOWN CUP ASSEMBLY I

As shown in FIGS. 1 and 2, vertically spaced and aligned shafts 204 and 206 extend through the side plates 54 and 54a, and are rotatably mounted in bearings 208, 208a. A pair of upper mounting levers 210 and a pair of lower mounting levers 212, respectively, are mounted on the shafts 204 and 206 with the free ends of the levers positioned above the pitting blade G. Said free ends are pivotally connected to vertically spaced trunnions 214 and 216 (FIGS. 9 and 10) projecting from square collars 218 and 220. The collars are secured to the upper and lower end portions of a tubular sleeve 222, the vertical axis of the sleeve being positioned to intersect the axis of rotation of the pitting blade G. The levers 210 and 212 principally serve to maintain the tubular body 222 in a vertical position. As shown in FIGS. 10 and 12, the lever 210 is formed of two side plates connected by a flat rib 223 which contacts a rubber pad 225a mounted on stop bolt 225 on a fixed angle bar 227 to limit downward movement of body 222.

Sliding within the body 222 is a vertical shaft 224 which at its lower end carries a resilient cup 226 for engaging and holding down a peach half positioned over the pitting blade G (as shown in FIG. 11). Means for mounting the cup includes a mounting disc 228 secured to the shaft 224 and having an annular resilient bumper 230 on its upper surface to cushion upward movement of the cup assembly against the collar 220.

The hold down cup 226 is urged downward by a tension spring 232. For this purpose, the spring is connected to an upper pin 234 that projects laterally from a follower bracket 236 held by a nut 237 on a shoulder on the upper end of the shaft 224. A laterally extending ledge 238 of bracket 236 rests upon a support roller 240 carried by an arm 242. The lower end of the spring 232 is connected to a pin 244 that projects from the hook-shaped end portion 246 of an arm 248, the major portion of which is laterally aligned with the arm 242. Arms 242 and 248 are connected together by a plate 250 and cooperatively form one arm of a bell crank 252 (FIG. 3). The bell crank includes a hub 254 which is mounted for rocking movement on a pivot shaft 256 extending between bearings 258 and 258a (FIGS. 1 and 2) on the outside of the side plates 54 and 54a. Referring back to FIGS. 9 and 10, a compression spring 260 is mounted on the shaft 224 between the underside of the bracket 236 and a tubular spring seat 262 which is mounted in the upper end of the tube 222. To prevent rotation of the shaft 224, the bracket 236 carries a guide roller 264 (FIG. 10) which rides in a keeper 266 of inverted U-shape that is welded to the plate 250.

The relative force applied by the springs 232 and 260 is such that the tension spring 232 will rapidly lower the fruit centering unit H and the hold down cup assembly I when the support roller 240 is lowered by the arm 242, and will keep the ledge 238 of bracket 236 in contact with the roller even when the compression spring 260 is slightly compressed. Thus, the hold down cup 226 is guided for substantially linear movement by the levers 210 and 212 and provides a nearly uniform downward holding pressure on the peach halves regardless of the usual variations in height of the peach halves.

THE FRUIT CENTERING UNIT H

In order to actuate the fruit centering unit H (FIGS. 9 and 10) and center each peach half over the pitting blade G, downward movement of the hold down cup assembly I as described automatically swings centering cups 270 and 272 (FIG. 10) to their phantom line fruit centering positions. Each cup (FIG. 10A) is formed of bent sheet metal; as shown for the upstream cup 272, two side wings 274 with an included angle of about 90° have a flat central portion secured to an arm 276 which depends from a yoke 278. The downstream cup 270 is similarly constructed and is secured to an arm 280 on a yoke 282.

Referring back to FIGS. 9 and 10, the centering cups 270 and 272 are pivotally connected to a rectangular cup mounting pad 284 which is integrally formed on the square mounting collar 220. Thus, the upstream cup mounting yoke 278 (FIG. 10A) is provided with aligned apertures 286 for receiving aligned pivot pins 288 (only one being shown in FIG. 10) that are fixed in the pad 284. The downstream cup mounting yoke 282 is similarly provided with aligned apertures 290 (FIG. 10A) for receiving aligned pivot pins 292, only one of which is shown in FIG. 10.

One arm of each yoke 278 and 282 (FIG. 10A) is extended toward the vertical centerline of the centering cups, and the two elongate arms 294 and 296 are diagonally opposite relative to the cup mounting pad 284 (FIGS. 9 and 10). Adjustable links 298 and 300, respectively, connect the arms 294 and 296 to individual fixed brackets 302 which are secured to the angle bar 227.

When the roller 240 (FIG. 9) that is engaged with the underside of the bracket ledge 238 is lowered, the stop pad 225a on stop bolt 225, (FIG. 10) is engaged by the rib 223, after the links 298 and 300 have caused the centering cups 270 and 272 to close to the phantom line position and center a peach half over the pitting blade G. The stop bolt 225 is positioned so that the lower edges of the centering cups, when closed, clear the surfaces supporting the peach half. When the roller 240 elevates the centering cups to the FIG. 10 open position, the lower edges of the cups provide ample clearance for either positioning or ejecting the largest peach half which can be handled.

Roller 240 (FIG. 9) is, as previously stated, mounted on the arm 242 (FIGS. 2 and 3) that is part of the bell crank 252. Depending from the bell crank hub 254 is a crank arm 303 which is eccentrically coupled to the driving disc N by a link 304 (FIG. 2) to raise and lower the fruit centering cups and the fruit hold down cup. Coupled at the same eccentric center to the driving disc N is an upright link 306 for driving the reciprocating carriage E. The link 306 is coupled to one arm of a bell crank 308 which rocks on a shaft 310 carried by bearings 312, 312a fixed on the side plates 54, 54a. A depending arm of the bell crank 308 is connected to the drive link 142 for the carriage E.

Motor L (FIGS. 2 and 3) is connected by a chain and sprocket drive train 314 to a driven shaft 316 which carries the drive disc N. The input shaft 318 for the gear box M is driven from shaft 316 by a chain and sprocket drive train 320 of 1:1 ratio. The gear box M is a commercially available unit which requires two revolutions of its input shaft 318 to rotate the output shaft 202, that drives the pitting blade G, through one revolution.

OPERATIONAL SEQUENCE AND TIMING

The operational FIGS. 13-20 are described in conjunction with the timing diagram of FIG. 21. In the starting position of FIG. 13, it is assumed that the fruit supply chute A is full, that a leading peach half PI is against the fruit stop B, that no peach halves have yet been pitted, and that the carriage E is at its upstream limit of movement. This starting position at 0 degrees (FIG. 21) is shown after two cycles, which equals two revolutions (720°) of the main driveshaft 316 (FIG. 3) and causes the carriage E to make two sets of forward and return strokes. Thus, FIGS. 13-17 inclusive show the operational results during the first cycle and first revolution of driveshaft 316, and FIGS. 18-20 deal with the second cycle and second revolution of the driveshaft. FIGS. 13-20 are labeled cycle 1 or cycle 2, with the approximate degree markings, to distinguish the two sets of forward and return strokes of the carriage.

Full retraction of the carriage E (FIG. 13), at 0° of the first cycle, carries the striker bolt 80 against the abutment 78 to raise the fingers 84, 84a of the fruit separating unit C. This lifts the leading portion of the peach half PII out of reach of the transfer jaws D when the jaws subsequently rise. The pusher 35 on the fruit ejector arm F is at this time laterally clear of the path of the peach halves.

In the first 15 degrees of movement of the driveshaft 316 during the first cycle (FIGS. 13 and 14) the carriage E remains in place because the friction drag mechanism 101 restrains the carriage sufficiently to assure that the drive link 142 first pivots the lift frame 132 and the jaws D upward before the carriage begins to move. When the lift frame 132 is pivoted upward, the fruit transfer jaws D rise to elevate the peach half PI above the fruit stop B, as shown in FIG. 14.

At this time the drive arm 146 contacts the abutment bolt 154 on the carriage E, the carriage begins to move downstream and the fruit separating unit C begins to lower the peach half PII for feeding toward the fruit stop B, as previously described. The peach half PI is thus carried downstream by the transfer jaws D to the position shown in FIG. 15, at about 180° in the first cycle. When the lift frame 132 was raised as in FIG. 14, the fruit ejector arm F was pivoted laterally about the pivot shaft 118 (FIG. 5) to place its pusher arm 35 in the path of the peach halves. Accordingly, when the carriage E moved to the FIG. 5 position at 180°, the pusher arm 35 was swept over the pitting blade G, and if a peach half had been pitted by the pitting blade in a previous operating cycle, that peach half would have been swept to the discharge chute K.

Beyond the FIG. 15, 180° position, the driving link 142 reverses its direction of movement, but the pivotal, lost motion connection provided by the lift frame 132 between the carriage and the driving link (plus the friction drag mechanism 101) first causes the lift frame to pivot about the shafts 122 and lower the peach half PI onto the fixed support surface including the rail 56. A 195° in the first cycle (FIG. 16), the drive arm 146 contacts the abutment bolt 156 in order to return the carriage E to its upstream position. Upon this reverse movement of the carriage, the ejector arm F is swung to retract its pusher arm 35 out of the path of the peach halves and to clear the fruit centering cups 270 and 272.

During the mechanical movements above described, the fruit centering unit H (FIG. 21) and the hold down cup assembly I are moving upward in the first 105° of rotation of the main driveshaft 316 (FIG. 3). Between the positions shown in FIGS. 14 and 15, the fruit centering unit H and the hold down cup assembly I begin to move downward. Referring now to FIGS. 16 and 17, while the carriage E returns to the starting position, the fruit centering cups 270 and 272 symmetrically close together, and the fruit hold down cup 226 descends within the chamber formed by the centering cups. In the present sequence, no fruit half has yet been positioned under these cups, but it will be apparent that the point at which the fruit has been centered and gripped will vary according to the size (height and diameter) of the fruit. Small fruit may be gripped and centered at about 220° on the FIG. 21 timing chart, and large fruit much earlier. In any case, at about 243° (FIG. 21) the pitting blade G begins to rotate into the fruit, and the blade completes one revolution about its turning axis, leaving the fruit at about 326°. Meanwhile, the carriage E in FIG. 17 is being returned to its fully retracted or start position to pick up the next peach half PII which is now resting against the fruit stop B. Thus, FIG. 18 shows the second cycle, corresponds to 15° of the second revolution of the driveshaft 316, and is mechanically a repetition of FIG. 14. The transfer jaws D have now elevated the peach half PII, and the peach half PI remains at rest in readiness for transfer to the pitting position over the pitting blade G.

As shown in FIG. 19, at 180° of the second cycle, when the elevated transfer jaws D move downstream, their leading ends 59 contact the peach half PI (still unpitted) and push that peach half into approximate vertical alignment with the pitting blade G. In FIG. 20, taken at 285° during the second cycle, the fruit centering cups 270 and 272 are closing, and in FIG. 20 have completely closed to center the peach half PI over the pitting blade G. At the same time, the fruit hold down cup 226 has descended onto the upper sector of the peach half to hold the fruit while the pitting blade G cuts through the fruit in an arcuate path over the pit or stone S.

The various components shown in FIG. 20 then return to the first cycle position shown in FIG. 13, by which time the stone S has been severed and dropped to a collection bin, not shown. (The pit removal occurs between 243 and 326 degrees as previously described.) The pitted peach half PI is then ejected into the discharge chute K by the pusher F, in the manner already described when the operating components are positioned as shown in FIG. 15, and the same operating functions repeat to feed, pit and discharge the peach halves PII, PIII etc.

FIGS. 22–27 schematically illustrate an important feature of the present invention, that feature being the capability of the apparatus to accommodate randomly intermixed large and small peach halves. In each of said Figures, the peach halves are identified according to their diameter as $s$, $m$ or $l$, indicating a small, medium or large diameter, but not necessarily the smallest or largest peach halves which can be handled.

In the event two adjacent peach halves s (FIGS. 22 and 23) are small, the fruit stop B arrests the leading peach half in a position wherein the trailing peach half overlies the transfer jaws D, but the upper end of the fruit separating finger 84 (and the concealed finger 84a aligned therewith) still lie forward of the centerline CL of the trailing fruit. Thus, when the fingers 84 (and 84a) rise, as shown in FIG. 23, the trailing small peach half s is first tilted rearward so that its forward end portion is lifted clear of the transfer jaws D when they elevate the leading peach half as shown. The leading and trailing peach halves are thus isolated from one another for downstream conveyance of only the leading peach half by the transfer jaws D, without interference to or from the trailing peach half.

In similar manner, if the leading end trailing peach halves are respectively small and medium, as shown in FIG. 24, the peach half m is tilted rearward by the fruit separating unit C to clear the transfer jaws D before they elevate the small peach half s, to isolate the two peach halves for their subsequent separation longitudinally of the conveying path.

It will be seen in FIG. 25 that when a small leading peach half s and a large trailing peach half 1 are vertically offset by the fruit separating unit C, the large peach half 1 still clears the transfer jaws D.

The FIG. 25 conditions are those which obtain proper separation under substantially all other conditions. In other words, if the slope of the feed chute A, the upward motion of the transfer jaws D and the fruit separating unit C are so related that the fruit on the transfer jaws is lifted clear of the fruit stop B (FIG. 22) and the trailing fruit is elevated by the fruit separating unit C clears the raised transfer jaws D, then similar conditions will obtain with all other combinations of small and large peach halves.

FIG. 26 shows a medium size leading peach half $m$, and a trailing small peach half $s$. Under these conditions, the small peach half s might either remain tilted with its leading end supported by the fruit separating unit C (in which case the subsequent operation is similar to those operations already described) or the small peach half might fall back onto the floor of the feed chute A. If the latter happens, the fruit separating finger 84 (84a) drops clear of the fruit after the first 15° of movement of the carriage E as earlier described, and succeeding incoming peach halves on the vibratory feed chute A push the leading peach half to the fruit stop B before the transfer jaws D are returned to fruit pickup position by the carriage E.

FIG. 27 illustrates a condition which is the reverse of FIG. 25, but which will result in substantially the same operation just described. In this case, a large peach half 1 on the transfer jaws D has previously held the small trailing peach half s rearwardly clear of the fruit separating finger 84 (84a) so that the raised fingers block egress of the trailing peach half s from the feed chute A when the transfer jaws D start to carry the large peach half 1 downstream. Thus, FIG. 27 illustrates a detail of the preferred construction, wherein the raised upper ends of the fruit separating fingers 84 (84a) contact but do not appreciably elevate the trailing end portion of a large peach half resting on the transfer jaws D. In this manner, the serrations on the transfer jaws D retain sufficient gripping contact with the large peach half for its positive removal and conveyance toward the pitting station, and as before, the trailing peach half is not disturbed by the transfer jaws.

Although the best mode contemplated for carrying out the present invention has been herein shown and described, it will be apparent that modification and variation may be made without departing from what is regarded to be the subject matter of the invention.

What is claimed is:

1. A peach pitting machine for removing the pits from peach halves at a pitting station comprising:
  a. means for assembling leading and trailing peach halves flat side down in a position upstream of the pitting station;
  b. reciprocable means for lifting the leading peach half from said assembling means in said upstream position;
  c. means for isolating the trailing peach half from said reciprocable means as the latter lifts said leading peach half;
  d. means for moving said reciprocable means and the leading peach half toward said pitting station during a first cycle of operation;
  e. said reciprocable means in the following cycle of operation pushing the leading peach half to said pitting station; and
  f. pitting means for removing the pit from the leading peach half at said pitting station.

2. Apparatus according to claim 1 wherein said reciprocable lifting means includes a slidable carriage continuously reciprocated between upstream and downstream positions; said carriage further including:
  a. linkage means mounting said isolating means to said carriage for substantially vertical movement; and
  b. abutment means contacted by said carriage in said upstream position for raising said isolating means.

3. Apparatus according to claim 2 and:
  a. a drive link movable in the direction of movement of said carriage;
  b. said linkage means including an upright link having an upper end pivoted to said carriage and a lower end connected to said drive link; and
  c. two carriage abutments in straddling relation with the lower end of said upright link, reciprocation of said carriage between the extreme upstream and downstream positions being thus delayed relative to said drive link until said upright link swings into contact with one or the other of said abutments.

4. Apparatus according to claim 3 and:
  a. pusher means mounted on said carriage for swinging movement about a vertical axis; and b. link means connecting the lower end of said upright link to said pusher means, said pusher means being swung into the path of said peaches immediately upstream of said pitting station when said drive link elevates said fruit lifting means.

5. Apparatus according to claim 4 and:
a. pitting blade means at said pitting station for cutting around the pit of a peach half positioned at said pitting station; and
b. drive means for said pitting blade means and said carriage to effect one pitting operation each time said carriage deposits a peach half adjacent said pitting station.

6. A peach pitting machine for removing the pits from peach halves at a pitting station comprising:
a. means for assembling leading and trailing peach halves flat side down in a position upstream of the pitting station;
b. a carriage having elevatable jaw means for lifting the leading peach half from said assembling means in said upstream position;
c. means for isolating the trailing peach half from said reciprocable means as the latter lifts said leading peach half;
d. means for moving said carriage and jaw means for depositing the leading peach half at a position upstream of said pitting station during a first cycle of operation;
e. means on said carriage for pushing the leading peach half into said pitting station during a second cycle of operation; and
f. pitting means for removing the pit from the leading peach half at said pitting station.

7. Apparatus according to claim 6 wherein said peach half isolating means includes an upstanding upwardly movable finger for engaging the leading end portion of the peach half, said elevatable jaw means including an elongate jaw blade declining toward said pitting station, the upper end of said upstanding finger in raised position elevating the peach half vertically clear of said jaw blade so that the confronting portions of said leading and trailing peach halves decline in opposite directions to inhibit forward movement of the trailing peach half and rearward movement of the leading peach half.

8. A peach pitting machine for removing the pits from peach halves at a pitting station comprising:
a. means for supporting and assembling leading and trailing peach halves flat side down in a position upstream of the pitting station;
b. reciprocable jaw means for lifting the leading peach half from said support means in said upstream position;
c. finger means for lifting the leading end of the trailing peach half clear of said reciprocable jaw means as the latter lifts said leading peach half;
d. means for moving said reciprocable jaw means and the leading peach half toward said pitting station during a first cycle of operation;
e. said jaw means in the next cycle of operation pushing the leading peach half to said pitting station; and
f. pitting means for removing the pit from the leading peach half at said pitting station.

9. Apparatus according to claim 8 and:
a. pusher means movable with said reciprocable jaw lifting means along said peach support means; and b. means for laterally moving said pusher means into and out of the path of the peach halves;
c. said pusher means being moved into said path between said leading and trailing peach halves for ejecting said leading peach half from said pitting station during the delivery and deposit of the next upstream peach half to a position adjacent said pitting station.

10. Apparatus according to claim 9 and:
a. fruit stop means on said support means for arresting the leading peach half in a position coinciding with said reciprocable jaw means when the latter is in said upstream position.

11. In a peach pitting machine for removing the pits from peaches bisected along their suture planes, a feed mechanism comprising:
a. a declining vibratory feed chute for gravitationally feeding a lane of incoming peach halves flat side down;
b. a substantially level support rail forming a continuation of the lower end of said feed chute;
c. a fruit stop straddling said support rail for arresting the leading fruit delivered from said feed chute;
d. a reciprocating carriage under said support rail; said carriage being movable between an upstream position beneath said fruit stop and a downstream position adjacent a pitting station;
e. vertically reciprocable fruit lifting jaws on said carriage straddling said support rail for lifting a peach half above said fruit stop;
f. vertically reciprocable fruit separating fingers adjacent the terminal end of said feed chute for lifting the leading end portion of the peach half next adjacent said fruit stop vertically clear of said fruit lifting jaws; and
g. means actuated by said reciprocating carriage for reciprocating said fruit lifting jaws and said fruit separating fingers to separate the respective peach halves supported by said lifting jaws and said separating fingers.

12. Apparatus according to claim 11 wherein the downstream movement of said carriage is such that said fruit lifting jaws in elevated position simultaneously deliver one peach half to a position adjacent said pitting station and push a peach half previously delivered to said adjacent position into alignment with said pitting station for removing the pit.

13. Apparatus according to claim 12 and:
a. a fruit ejector arm reciprocable with said carriage and having a pusher arm end portion movable into and out of the path of the fruit on said support rail;
b. pivot means mounting said ejector arm to said carriage for swinging movement in a horizontal plane; and
c. linkage means connecting said carriage and said pusher arm for respectively moving said pusher arm end portion into said path and out of said path with downstream and upstream movement of said carriage; downstream movement of said pusher arm in the path of the fruit beginning at a point immediately upstream of said pitting station; upstream movement of said pusher arm being out of the path of movement of the fruit for the full upstream movement of said carriage.

14. Apparatus according to claim 1 wherein said pitting means includes two horizontally aligned hubs having square bores, a U-shaped pitting blade having leg end portions connected to said hubs and a bight portion connecting the other ends of said legs, a square driveshaft in driving engagement with each hub, the two driveshafts leaving the bight of the blade open and extending in opposite directions, and means resiliently biasing said driveshafts toward the bight, each drive shaft being depressible away from the bight to clear its associated hub for removal of the blade.

15. Apparatus according to claim 14 and an abutment carried on the distal end of each driveshaft, and a hollow hub enclosing each end and having a lateral bore intersecting the axis of the associated driveshaft, said driveshaft being depressible to disengage said hub and position said abutment laterally outward of said bore, a pin inserted through the bore intersecting the path of said abutment to lock the driveshaft in retracted position and free the pitting blade for removal and replacement.

* * * * *